(No Model.)

O. T. JOSLIN & H. B. SCHMIDT.
MACHINE FOR THICKENING LIQUIDS.

No. 603,085. Patented Apr. 26, 1898.

Witnesses:
E. R. Shipley,
M. S. Belden.

Omar T. Joslin
Herman B. Schmidt
Inventors by James W. See
Attorney

UNITED STATES PATENT OFFICE.

OMAR T. JOSLIN, OF NEW YORK, N. Y., AND HERMAN B. SCHMIDT, OF CINCINNATI, OHIO, ASSIGNORS OF ONE-HALF TO THE BLACK & CLAWSON COMPANY, OF HAMILTON, OHIO.

MACHINE FOR THICKENING LIQUIDS.

SPECIFICATION forming part of Letters Patent No. 603,085, dated April 26, 1898.

Application filed May 4, 1897. Serial No. 635,098. (No model.)

*To all whom it may concern:*

Be it known that we, OMAR T. JOSLIN, of New York, New York county, New York, and HERMAN B. SCHMIDT, of Cincinnati, Hamilton county, Ohio, have invented certain new and useful Improvements in Machines for Thickening Liquids, (Case C,) of which the following is a specification.

This invention pertains to improvements in machines for thickening liquids by process of transferring heat, as by vaporizing portions of the liquid away by adding heat or by cooling a warm liquid by abstracting heat from it.

Our present improvement will be readily understood from the following description, taken in connection with the accompanying drawings, in which—

Figure 2:
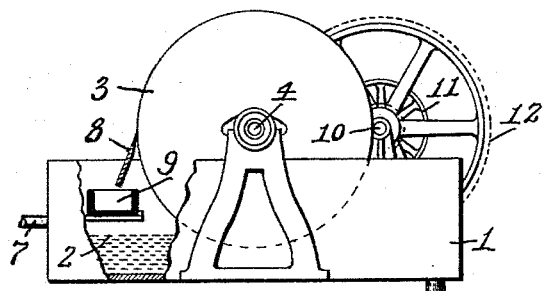
Figure 1:
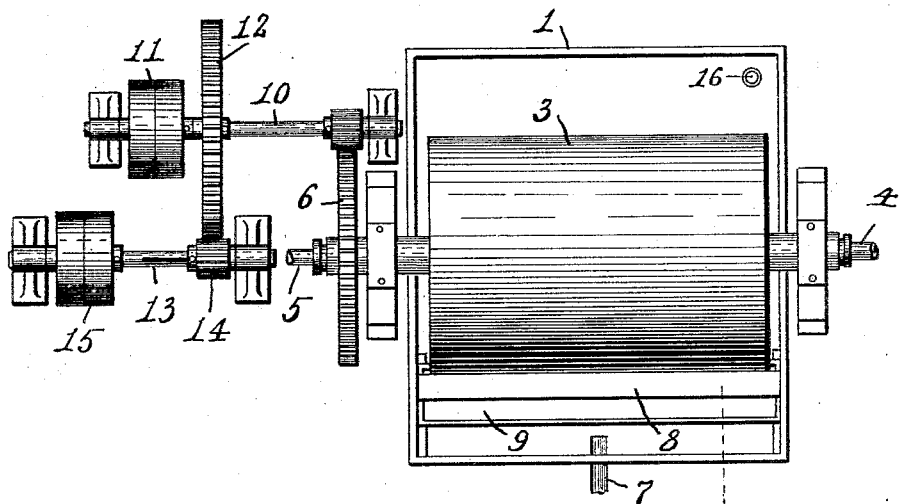

Figure 1 is a plan of a machine exemplifying our invention; and Fig. 2 a side elevation of the same, partly in vertical section.

In the drawings, 1 indicates a vat adapted to receive the liquid to be dealt with; 2, the upper surface of the liquid therein; 3, a hollow metallic cylinder mounted in suitable bearings and dipping the lower portion of its periphery into the liquid in the vat; 4, inlet-pipe for the thermic fluid or liquid into the cylinder; 5, outlet-pipe for the thermic fluid or liquid from the cylinder, the inlet and outlet pipes being illustrated as communicating with the interior of the cylinder through its opposite end journals; 6, a gear upon one of the necks of the cylinder; 7, an inlet-pipe for admitting to the vat the liquid to be dealt with; 8, a doctor engaging the periphery of the cylinder at a point over the liquid in the vat at that side of the cylinder approaching the liquid; 9, a catch box or pan removably supported in the vat below the doctor 8; 10, a shaft with its axis parallel with that of cylinder 3 and having a pinion engaging gear 6; 11, tight and loose pulleys on shaft 10, the arrangement being obviously such that a belt on pulleys 11 will give rotary motion to the cylinder; 12, a gear on shaft 10; 13, a shaft parallel with shaft 10; 14, a pinion on shaft 13 and engaging gear 12, this pinion being preferably splined to shaft 13, so that it may be slid out of engagement with its gear; 15, tight and loose pulleys on shaft 13, and 16 an outlet from the vat to serve in emptying it.

Assume that the liquid to be dealt with is, for example, the so-called "tank-water" of the packing-house, from which it is desired to get the solid ammoniate. The liquid portion of the matter is to be gotten out by evaporation, leaving a thicker liquid or a solid. In such case in the use of our machine steam or other hot fluid or liquid is to be passed through cylinder 3. Assume steam to be employed as the thermic fluid in the cylinder. The hot cylinder is set in motion in the direction of the arrow, and the liquid to be dealt with is introduced, as at inlet 7, and maintained in the vat at substantially the same level as evaporation takes place. The cylinder as it turns in the liquid in the vat will become wetted or coated thereby. As the coated surface of the cylinder travels upwardly out of the vat the heat of the cylinder causes the lighter liquid portions of the matter to evaporate from the coating, the vapor going to the atmosphere and leaving a comparatively dry coating upon the cylinder. This coating is scraped from the cylinder by doctor 8, which returns it to the vat, catch-box 9 being assumed as absent, the scrapings from the doctor joining the liquid in the vat, the cylinder thus continuing to act on the matter in the vat by evaporating from it its lighter liquid portions, the matter in the vat thus getting continually thicker.

In the example of liquid above referred to the thickening of the liquid was effected by the addition of heat to it, the heat resulting in the evaporation of the lighter liquid portions of the matters. Assume now that the liquid to be dealt with is oil or lard to be thickened by abstracting heat from it. In such case the liquid will be supplied to the vat, as before, but the thermic fluid or liquid supplied within the cylinder will be cold—as, for instance, refrigerated air or refrigerated water or brine. The rotating cylinder takes up liquid from the vat in the form of a coating on the cylinder, heat becoming transferred from that coating to the metal of the cylinder and to the thermic agent within the cylinder, resulting in the solidification of the coating upon the cylinder. This coating becomes scraped off by the doctor and returned to the vat, the cylinder continuing to act upon the mass in the vat until the thermic agent passing through the cylinder has carried away such heat from the mass in the vat as to result in the desired degree of solidification.

In the early stages of either of the processes mentioned while the machine is dealing with a thin liquid the coating formed upon the cylinder as its rises from the liquid is a mere wetting and the coating is of extreme thinness and the liquid is liable to flow downward and backward to the vat. We overcome this by turning the cylinder 3 at comparatively high speed, using the belt on pulleys 11. The consequence is that the wetted surface of the cylinder is hurried upward from the tank to an evaporative exposure, the result of the evaporation being the formation upon the cylinder of a thin dry film, which is scraped off by the doctor and returned to the vat, the contents of the vat constantly becoming thicker. The time will come when the liquid becomes so thickened in the vat that it will form such a thick coating upon the cylinder that the heat will not readily or rapidly transfer from the intermediate portions of the thickness of the coating. When this stage of the process has been reached, we introduce the catch-box 9 under the doctor and we slow down the rotative speed of the cylinder by employing the belt on pulleys 15, the nature of the gearing being such as to very much reduce the speed of the cylinder. Under these new conditions the comparatively thick liquid in the vat forms a very thick coating on the cylinder, which is carried slowly toward the doctor and reaches the doctor as a dry coating, the doctor scraping it away and delivering it to the catch-box.

We claim as our invention—

In a machine for thickening liquids, the combination, substantially as set forth, of a vat to hold the liquid before, during, and after thickening, a hollow metallic cylinder mounted for rotation in said vat with its lower portion dipping into the liquid therein, inlet and outlet pipes for passing a thermic agent through said cylinder, a doctor in contact with the surface of said cylinder and disposed above the liquid in the vat and arranged to discharge its scrapings back into the liquid in the vat whereby the cylinder mixes said scrapings with said liquid and continues to act on the mixed mass, a driving mechanism arranged to turn said cylinder, and a second driving mechanism arranged to similarly turn said cylinder but at a lower rate of speed than said first-mentioned driving mechanism, whereby portions of the thin liquid are thickened into a film, the filmed matter returned to the thin liquid to form a somewhat thickened mixture in the vat, the somewhat thickened mixture still further thickened by returning to it portions withdrawn from it and thickened by filming, and finally thickened by filming at relative low rate of procedure to produce a film of excessive depth.

OMAR T. JOSLIN.
HERMAN B. SCHMIDT.

Witnesses:
SAM D. FITTON, Jr.,
E. J. SCHRODER.